(12) United States Patent
Imamura et al.

(10) Patent No.: US 8,941,800 B2
(45) Date of Patent: Jan. 27, 2015

(54) REFLECTIVE IMAGE FORMING ELEMENT AND OPTICAL SYSTEM

(75) Inventors: Kentarou Imamura, Osaka (JP); Shigeto Yoshida, Osaka (JP); Takafumi Shimatani, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 152 days.

(21) Appl. No.: 13/581,983

(22) PCT Filed: Feb. 25, 2011

(86) PCT No.: PCT/JP2011/054375
§ 371 (c)(1),
(2), (4) Date: Aug. 30, 2012

(87) PCT Pub. No.: WO2011/108469
PCT Pub. Date: Sep. 9, 2011

(65) Prior Publication Data
US 2012/0320322 A1 Dec. 20, 2012

(30) Foreign Application Priority Data
Mar. 1, 2010 (JP) .................................. 2010-044693

(51) Int. Cl.
*G02B 5/136* (2006.01)
*G02B 17/00* (2006.01)
(Continued)

(52) U.S. Cl.
CPC .............. *G02B 17/002* (2013.01); *G02B 5/136* (2013.01); *G02B 27/2292* (2013.01); *G02B 5/12* (2013.01); *G02B 5/124* (2013.01)
USPC .......................................... 349/113; 359/627

(58) Field of Classification Search
CPC .................................................... G02B 26/001
USPC ........................................................ 349/113
See application file for complete search history.

(56) References Cited

U.S. PATENT DOCUMENTS

| 5,396,350 | A * | 3/1995 | Beeson et al. .................. 349/62 |
| 2001/0019748 | A1 * | 9/2001 | Beeson et al. .................. 428/14 |

(Continued)

FOREIGN PATENT DOCUMENTS

| JP | 2008-158114 A | 7/2008 |
| JP | 2009-025776 A | 2/2009 |

(Continued)

OTHER PUBLICATIONS

International Search Report PCT/ISA/210.
(Continued)

*Primary Examiner* — Michael Caley
*Assistant Examiner* — Edmond Lau
(74) *Attorney, Agent, or Firm* — Harness, Dickey & Pierce, P.L.C.

(57) ABSTRACT

A reflective imaging element includes: a plurality of holes penetrating through the plate-like substrate along a thickness direction thereof; two orthogonally-disposed specular elements on inner walls of the plurality of holes; a first principal face on which light from an object is received; a second principal face parallel to the first principal face; and two taper elements opposing the two specular elements. The two taper elements each have a first side parallel to the first principal face, a second side orthogonal to the first principal face and to the first side, and a hypotenuse meeting the first and second sides and constituting an angle β with the second side. An angle constituted by a normal direction of the first principal face and an incident direction of light striking the first principal face defines an incident angle θ, such that, in a range of 0°<θ<90°, the angle β satisfies (90°−θ)/4≤β.

7 Claims, 7 Drawing Sheets

(51) Int. Cl.
  *G02B 27/22* (2006.01)
  *G02B 5/12* (2006.01)
  *G02B 5/124* (2006.01)

(56) References Cited

U.S. PATENT DOCUMENTS

| | | | |
|---|---|---|---|
| 2009/0310231 A1* | 12/2009 | Maekawa | 359/733 |
| 2010/0073751 A1 | 3/2010 | Maekawa | |
| 2010/0177402 A1 | 7/2010 | Maekawa | |
| 2010/0214394 A1 | 8/2010 | Maekawa | |
| 2010/0231860 A1* | 9/2010 | Maekawa | 353/10 |
| 2011/0235201 A1 | 9/2011 | Maekawa | |
| 2012/0268640 A1 | 10/2012 | Shimatani et al. | |

FOREIGN PATENT DOCUMENTS

| | | |
|---|---|---|
| JP | 2009-042337 A | 2/2009 |
| JP | 2009-075483 A | 4/2009 |
| JP | 2009-276698 A | 11/2009 |
| JP | 2009-276699 A | 11/2009 |
| WO | WO-2007/116639 A1 | 10/2007 |
| WO | WO-2008/075700 A1 | 6/2008 |
| WO | WO-2008/111426 A1 | 9/2008 |

OTHER PUBLICATIONS

International Preliminary Report on Patentability Sep. 20, 2012.

* cited by examiner (a)

(b)

(a)

(b)

(a)

(b)

(c)

(a)

(b)

(a)

(b)

(a)

(b)

(c)

REFLECTIVE IMAGE FORMING ELEMENT AND OPTICAL SYSTEM

TECHNICAL FIELD

The present invention relates to an optical system having a reflective imaging element which is capable of forming an image of an object in a space and a liquid crystal display panel.

BACKGROUND ART

In recent years, an optical system for forming an image of an object in a space by using a reflective imaging element has been proposed (for example, Patent Documents 1 to 5). The optical system includes a reflective imaging element and an object, and an image to be displayed in a space is an image of the object, which forms at a position of planar symmetry with respect to the reflective imaging element as a plane of symmetry.

The reflective imaging element disclosed in Patent Document 1 has holes penetrating through a plate-like substrate along its thickness direction, such that an optical element composed of two orthogonally-disposed specular elements is formed on the inner walls of each hole (see FIG. 4 of Patent Document 1), or has a plurality of transparent cylindrical bodies protruding in the thickness direction of the substrate, such that an optical element composed of two orthogonally-disposed specular elements is formed on the inner wall surface of each cylindrical body (see FIG. 7 of Patent Document 1).

In the reflective imaging elements disclosed in Patent Documents 1, 2, and 5, tens to hundreds of thousands of square holes, each of whose sides measures about 50 μm to 1000 μm, are formed in a substrate having a thickness of 50 μm to 1000 μm, the inner surface of each hole being mirror coated by electroforming technique, nanoprinting technique, or sputtering technique.

An optical system in which a reflective imaging element is used utilizes specular reflection of the reflective imaging element, and, according to its principles, the ratio in size between the image of the object and the image appearing in the space is 1:1.

For reference sake, the entire disclosure of Patent Documents 1 to 5 is incorporated herein by reference.

CITATION LIST

Patent Literature

[Patent Document 1] Japanese Laid-Open Patent Publication No. 2008-158114
[Patent Document 2] Japanese Laid-Open Patent Publication No. 2009-75483
[Patent Document 3] Japanese Laid-Open Patent Publication No. 2009-42337
[Patent Document 4] Japanese Laid-Open Patent Publication No. 2009-25776
[Patent Document 5] International Publication No. 2007/116639

SUMMARY OF INVENTION

Technical Problem

In the aforementioned optical system, when an object is placed with a tilt relative to the reflective imaging element, the image (hereinafter referred to as an "aerial image") appearing in the air also becomes angled, thus producing an effect of an aerial image floating in the space (Japanese Patent Application No. 2009-248265). Moreover, as the tilting angle of the object relative to the reflective imaging element is increased, a more upright image is formed as an aerial image in the air, whereby an image with enhanced reality can be displayed.

When an image which is displayed on a display panel is used as the object, the image which is displayed on the display panel appears upright in the air. Therefore, even though the image displayed on the display panel is a two-dimensional image, an aerial image would appear floating in the space to the viewer, thus resulting in a perception as if a three-dimensional image were being displayed in the air. In the present specification, an image which is perceived by a viewer as if a three-dimensional image were floating in the air in this manner may be referred to as an "airy image". For reference sake, the entire disclosure of Japanese Patent Application No. 2009-248265 is incorporated herein by reference.

In the above optical system, as the tilting angle of the object relative to the reflective imaging element is increased, a more upright image is formed as an aerial image in the air, thus producing greater airiness. However, studies of the inventors have found a problem in that, depending on the structure of the reflective imaging element, increasing the tilting angle of the object may lower the efficiency of light utility, thus deteriorating the visual recognition of the aerial image.

The present invention has been made in view of the above problems, and an objective thereof is to provide an optical system which allows for high visual recognition of an aerial image and an reflective imaging element to be used in such an optical system.

Solution to Problem

A reflective imaging element according to the present invention includes: a plate-like substrate; a plurality of holes penetrating through the plate-like substrate along a thickness direction thereof; two orthogonally-disposed specular elements on inner walls of the plurality of holes; a first principal face on which light from an object is received; and a second principal face parallel to the first principal face, wherein, the first principal face has a plurality of first light-transmitting portions, and the second principal face has a plurality of second light-transmitting portions, an area of each of the plurality of first light-transmitting portions being larger than an area of each of the plurality of second light-transmitting portions; each of the plurality of first light-transmitting portions is connected to a respective one of the plurality of second light-transmitting portions via a corresponding hole among the plurality of holes; two taper elements opposing the two specular elements are comprised; the two taper elements each have a first side which is parallel to the first principal face, a second side which is orthogonal to the first principal face and to the first side, and a hypotenuse which meets the first and second sides and constitutes an angle $\beta$ with the second side; and an angle constituted by a normal direction of the first principal face and an incident direction of light striking the first principal face defines an incident angle $\theta$, such that, in a range of $0°<\theta<90°$, the angle $\beta$ satisfies $(90°-\theta)/4 \le \beta$.

In one embodiment, the angle $\beta$ satisfies $(90°-\theta)/2 \le \beta$.

Another reflective imaging element according to the present invention includes: a plate-like substrate; a plurality of holes penetrating through the plate-like substrate along a thickness direction thereof; two orthogonally-disposed specular elements on inner walls of the plurality of holes; a first principal face on which light from an object is received; and a second principal face parallel to the first principal face, wherein, the first principal face has a plurality of first light-transmitting portions, and the second principal face has a plurality of second light-transmitting portions, an area of each of the plurality of first light-transmitting portions being larger than an area of each of the plurality of second light-transmitting portions; each of the plurality of first light-transmitting portions is connected to a respective one of the plurality of second light-transmitting portions via a corresponding hole among the plurality of holes; and a light shielding layer is comprised on the second principal face opposing the two specular elements.

One embodiment includes a plurality of light shielding members disposed at the second principal face side of the substrate, each of the plurality of light shielding members being disposed so as to only partially shade a second opening each of the plurality of holes, wherein the plurality of second openings only partially shaded by the plurality of light shielding members define the plurality of second light-transmitting portions.

An optical system according to the present invention includes: the above reflective imaging element; and a display panel disposed at the first principal face side, the optical system causing an image displayed on a display surface of the display panel to form an image at a position of planar symmetry with respect to the reflective imaging element as a plane of symmetry, wherein, the first and second light-transmitting portions of the reflective imaging element each have first and second sides orthogonal to each other; ab>a'b' holds, where a is a length of the first side and b is a length of the second side of the first light-transmitting portion, a' is a length of the first side and b' is a length of the second side of the second light-transmitting portion, and c is a height of the hole; and an incident angle θ constituted by a normal direction of the first principal face and an incident direction of light on the first principal face satisfies the following eq. (1) in a range of 0°<θ<90°.

[math. 1]

$$90° - \tan^{-1}\left(\frac{c}{\sqrt{a'^2 + b'^2}}\right) \leq \theta \leq 90° - \tan^{-1}\left(\frac{c}{\sqrt{a^2 + b^2}}\right) \quad (1)$$

In one embodiment, the incident angle θ satisfies the following eq. (2).

[math. 2]

$$\theta = \frac{\left(90° - \tan^{-1}\left(\frac{c}{\sqrt{a'^2 + b'^2}}\right)\right) + \left(90° - \tan^{-1}\left(\frac{c}{\sqrt{a^2 + b^2}}\right)\right)}{2} \quad (2)$$

In one embodiment, the display panel is a liquid crystal display panel.

Advantageous Effects of Invention

According to the present invention, an optical system having a reflective imaging element which allows for high visual recognition of an aerial image is provided.

DESCRIPTION OF EMBODIMENTS

Hereinafter, embodiments of the present invention will be described with reference to drawings; however, the present invention is not limited to the illustrated embodiments.

First, problems of conventional reflective imaging elements which were found by the inventors will be described.

Figure 8:
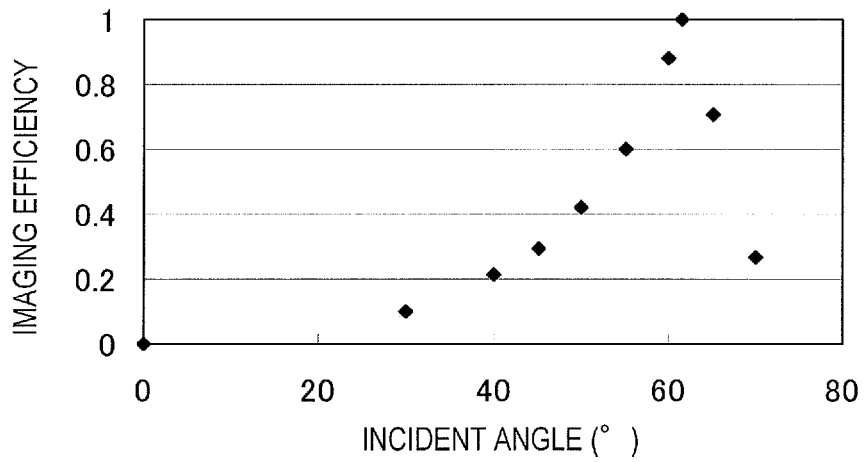
FIG. 8 A graph showing a relationship between the light incident angle and imaging efficiency in an optical system 90.

According to studies of the inventors, there is a problem in that the luminance of an aerial image changes depending on the incident angle by which light enters a reflective imaging element, thus affecting the visual recognition of the aerial image. This is particularly true when each hole penetrating through the reflective imaging element has the shape of a rectangular solid (i.e., the aperture ratio of the throughhole on the light-incident side and the aperture ratio of the throughhole on the light-outgoing side are equal). With reference to FIG. 8, changes in the aerial image luminance of a reflective imaging element 80 in the case where the throughhole has a rectangular solid shape will be described. FIG. 8 is a graph showing a relationship between the light incident angle and imaging efficiency of an optical system 90 having a reflective imaging element 80. In the present specification, "imaging efficiency" refers to a proportion of parallel light that contributes to image formation, within parallel light coming from an object (e.g., a display panel 30). As the imaging efficiency becomes closer to 1, the reflective imaging element more efficiently allows the light from the object to form an image and the aerial image permits higher visual recognition. As can be seen from FIG. 8, the imaging efficiency of light depends greatly on the light incident angle. Hence, the light incident angle affects the aerial image luminance, thus greatly influencing the visual recognition of the aerial image.

The present invention provides an optical system whose aerial image luminance is not easily affected by the light incident angle, or a reflective imaging element for use in such an optical system.

Figure 1:
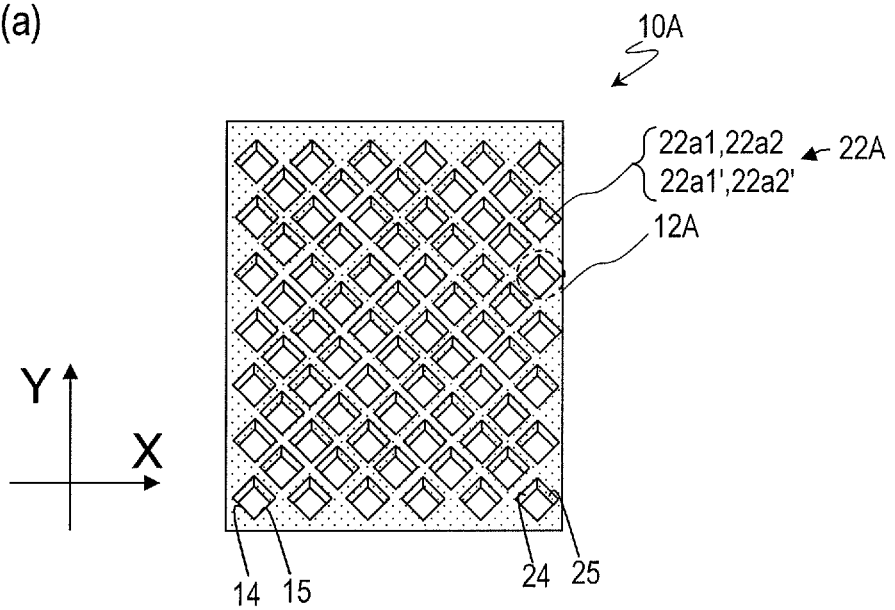
FIG. 1 (a) is a schematic plan view of a reflective imaging element 10A according to an embodiment of the present invention; and (b) is a diagram showing a schematic perspective view of a unit imaging element 12A and a light path (arrow 60).
Figure 1:
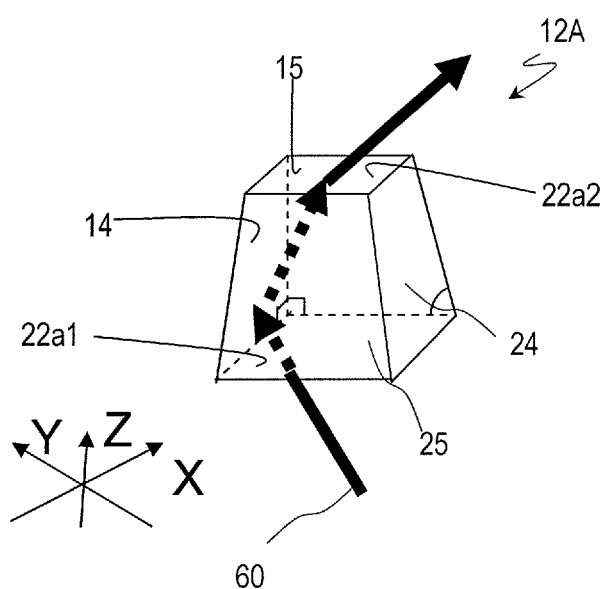
Figure 2:
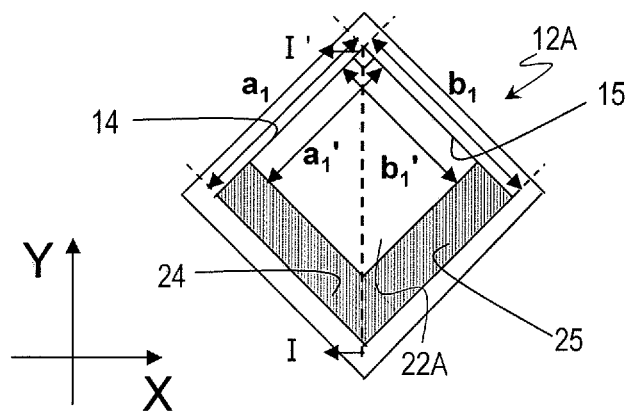
FIG. 2 (a) is a schematic upper plan view of the unit imaging element 12A; and (b) is a schematic cross-sectional view of the unit imaging element 12A corresponding to I-I' in (a).
Figure 2:
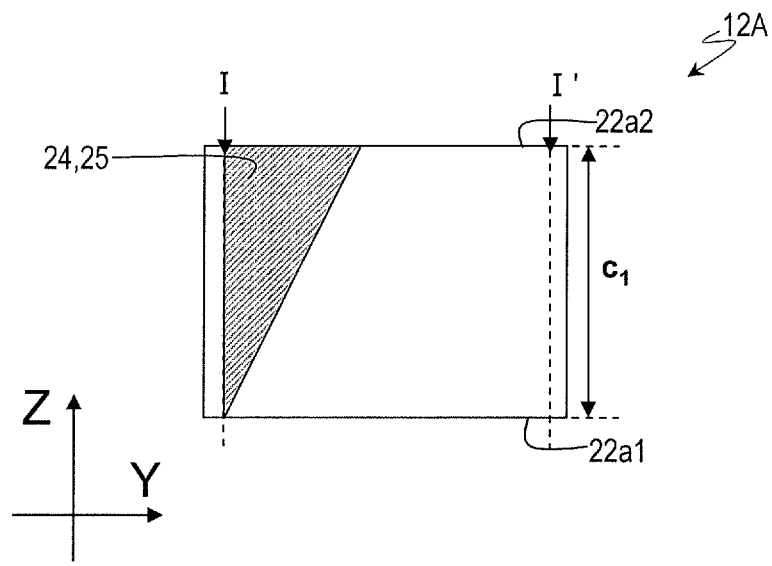

With reference to FIG. 1 and FIG. 2, the construction of a reflective imaging element 10A according to an embodiment of the present invention will be described. FIG. 1(a) is a schematic plan view showing the construction of the reflective imaging element 10A. FIG. 1(b) is a diagram showing a schematic perspective view of a unit imaging element 12A and a light path 60. Each unit element composing the reflective imaging element 10A is referred to as a unit imaging element 12A.

The reflective imaging element 10A shown in FIG. 1(a) has a plate-like substrate, and a plurality of holes 22A penetrating through the plate-like substrate along the thickness direction thereof. Each of the plurality of holes 22A is hollow. Furthermore, the reflective imaging element 10A has on the inner walls of the plurality of holes 22A two specular elements 14 and 15 that are orthogonal to each other as well as taper elements 24 and 25 opposing the two specular elements 14 and 15, and has a first principal face on which to receive light from an object (e.g., the display panel 30), and a second principal face parallel to the first principal face. The first principal face has a plurality of first light-transmitting portions 22a1, and the second principal face has a plurality of second light-transmitting portions 22a2. Each of the plurality of first light-transmitting portions 22a1 is connected to a respective one of the plurality of second light-transmitting portions 22a2 via the corresponding hole among the plurality of holes 22A. The area of each of the plurality of first light-transmitting portions 22a1 is larger than the area of each of the plurality of second light-transmitting portions 22a2. Moreover, each of the plurality of holes 22A has a first opening 22a1' on the first principal face side and a second opening 22a2' on the second principal face side. The area of each of the plurality of first openings 22a1' is larger than the area of each of the plurality of second openings 22a2'. Each of the plurality of first openings 22a1' defines the respective first light-transmitting portion 22a1, whereas each of the plurality of second openings 22a2' defines the respective second light-transmitting portion 22a2. Note that the plurality of holes 22A may be filled with transparent resin or the like. On the second principal face, a light shielding layer (described later) which partly closes the second openings 22a2' may be provided. In this case, each light shielding layer defines the respective second light-transmitting portion 22a2.

As shown in FIG. 1(b), the unit imaging element 12A has a throughhole along its thickness direction (z direction). The shape of the throughhole 22A as viewed from the normal direction of the reflective imaging element 10A is essentially rectangular. Furthermore, on the inner walls of the throughhole 22A, the unit imaging element 12A has the two orthogonally-disposed specular elements 14 and 15, the first light-transmitting portion 22a1, and the second light-transmitting portion 22a2. The two specular elements 14 and 15 are disposed perpendicular to the first principal face. On the other two faces within the inner wall surface of the throughhole 22A, the taper elements 24 and 25 are formed. Because of the taper elements 24 and 25, the first light-transmitting portion 22a1 and the second light-transmitting portion 22a2 have differing areas. As indicated by arrow 60, the light entering the unit imaging element 12A forms an image in the air by undergoing two reflections (metallic reflection or total reflection) at the two specular elements 14 and 15.

FIG. 2(a) is a schematic perspective view of the unit imaging element 12A. FIG. 2(b) is a schematic cross-sectional view of the unit imaging element 12A corresponding to I-I' in FIG. 2(a).

As shown in FIG. 2(a) and FIG. 2(b), the first light-transmitting portion 22a1 and the second light-transmitting portion 22a2 of the unit imaging element 12A each have a first side and a second side which are orthogonal to each other. The first side of the first light-transmitting portion 22a1 has a length $a_1$, and the second side a length $b_1$. The first side of the second light-transmitting portion 22a2 has a length $a_1'$, and the second side a length $b_1'$. The area $a_1 b_1 (a_1 \times b_1)$ of the first light-transmitting portion 22a1 and the area $a_1' b_1' (a_1' \times b_1')$ of the second light-transmitting portion 22a2 are of the relationship: area $a_1 b_1$ > area $a_1' b_1'$. The throughhole 22A has a height $c_1$. The unit imaging element 12A has taper elements 24 and 25 that are formed opposite from the two specular elements 14 and 15.

Figure 3:
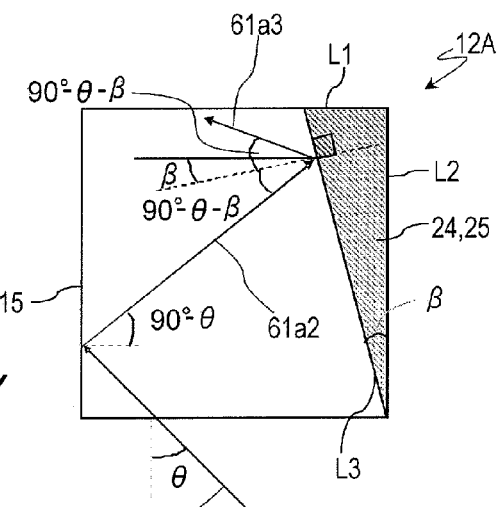
FIGS. 3 (a) and (b) are diagrams for explaining taper elements 24 and 25 and a stray light path; and (c) is a diagram for explaining the taper elements 24 and 25.
Figure 3:
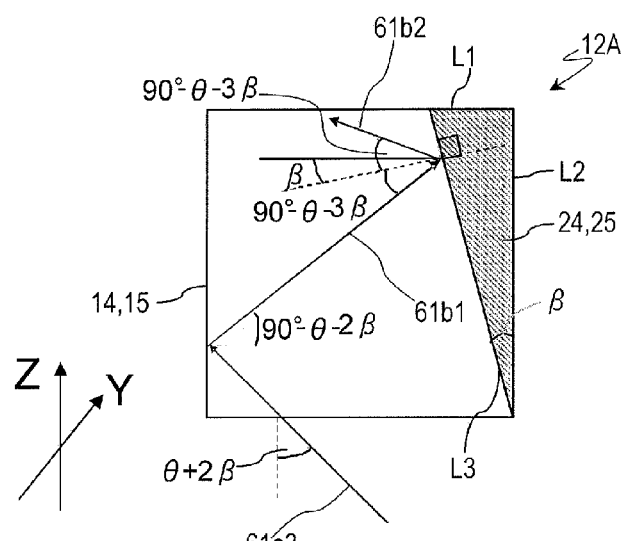
Figure 3:
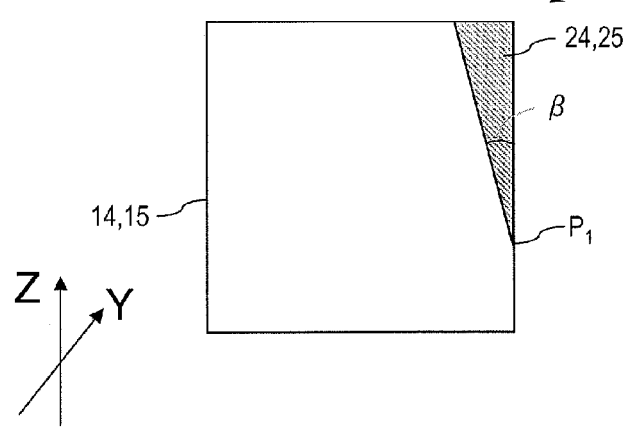

Next, the taper elements 24 and 25 will be described with reference to FIG. 3.

FIG. 3(a) to FIG. 3(c) are schematic cross-sectional views of the unit imaging element 12A. FIG. 3(a) is a diagram showing a path of light 61a1 incident on the unit imaging element 12A, which strikes the specular element (or 15) to reflect as reflected light 61a2, which strikes one of the taper elements 24 (or 25) to reflect as light 61a3. FIG. 3(b) is a diagram showing a path of the light 61a3 shown in the FIG. 3(a), which strikes the other specular element 15 (or 14) to reflect as reflected light 61b2, which strikes the other taper element 25 (or 24) to reflect as light 61b2. The taper elements 24 and 25 each have a first side L1 which is parallel to the first principal face of the reflective imaging element 10A, a second side L2 which is orthogonal to the first principal face and the first side L1, a hypotenuse L3 which meets the first side L1 and the second side L2, with an angle β between the second side L2 and the hypotenuse L3.

As shown in FIG. 3(a), when light 61a1 entering with an incident angle θ strikes the specular element 14 (or 15), the reflected light 61a2 thereof has a reflection angle of 90°−θ. The reflected light 61a2 strikes the taper element 24 (or 25) with an incident angle of 90°−θ−β. The taper element 24 (or 25) also causes reflected light 61a3, the reflected light 61a3 having a reflection angle of 90°−θ−β. Since the reflected light 61a3 is stray light not contributing to image formation, it is preferably restrained from exiting from the light-outgoing side of the reflective imaging element 10A. The taper elements 24 and 25 also provide the effect of preventing stray light from exiting from the light-outgoing side of the reflective imaging element 10A. When the reflection angle 90°−θ−β is equal to or less than the angle β (90°−θ−β≤β), stray light is restrained from exiting from the light-outgoing side of the reflective imaging element 10A, thus enhancing visual recognition in the formed image. Therefore, it is preferable that the angle β of the taper elements 24 and 25 is in the range of (90°−θ)/2≤β.

As shown in FIG. 3(b), when the light 61a3 shown in FIG. 3(a) enters the specular element 15 (or 14) with an incident angle of θ+2β, the reflected light 61b1 thereof has a reflection angle of 90°−θ−2β. The reflected light 61b1 strikes the taper element 25 (or 24) with an incident angle of 90°31 θ−2β. The taper element 25 (or 24) also causes reflected light 61b2, the reflected light 61b2 having a reflection angle of 90°−θ−3β. Since the reflected light 61b2 is stray light not contributing to image formation, it is preferably restrained from exiting from the light-outgoing side of the reflective imaging element 10A. When the reflection angle 90°−θ−3β is equal to or less than the taper angle β (90°−θ−3β≤β), stray light is restrained from exiting from the light-outgoing side of the reflective imaging element 10A. Therefore, it is preferable that the angle β of the taper elements 24 and 25 is in the range of (90°−θ)/4≤β. There is no particular limitation as to the upper limit value of the angle β, which may be determined as appropriate by taking luminance of the formed image, etc., into consideration.

Moreover, the angle β is determined so as not to close the aforementioned second light-transmitting portion 22a2.

Thus, in order to restrain stray light from exiting from the light-outgoing side of the reflective imaging element 10A, the angle β of the taper elements 24 and 25 is preferably in the range of $(90°-θ)/4 ≤ β$, and more preferably in the range of $(90°-θ)/2 ≤ β$. Moreover, as shown in FIG. 3(c), a beginning $P_1$ of the taper elements 24 and 25 may emerge somewhere along the thickness direction of the reflective imaging element so that the angle β of the taper elements 24 and 25 satisfies the range of $(90°-θ)/2 ≤ β$ or $(90°-θ)/4 ≤ β$, thus forming the taper elements 24 and 25. When the angle β is in the aforementioned range, stray light not contributing to image formation is restrained from exiting the light-outgoing side of the reflective imaging element 10A. Although an example where the taper angles (angles β) of the two taper elements 24 and 25 are the same angle is illustrated herein, they may be different angles from each other.

Figure 4:
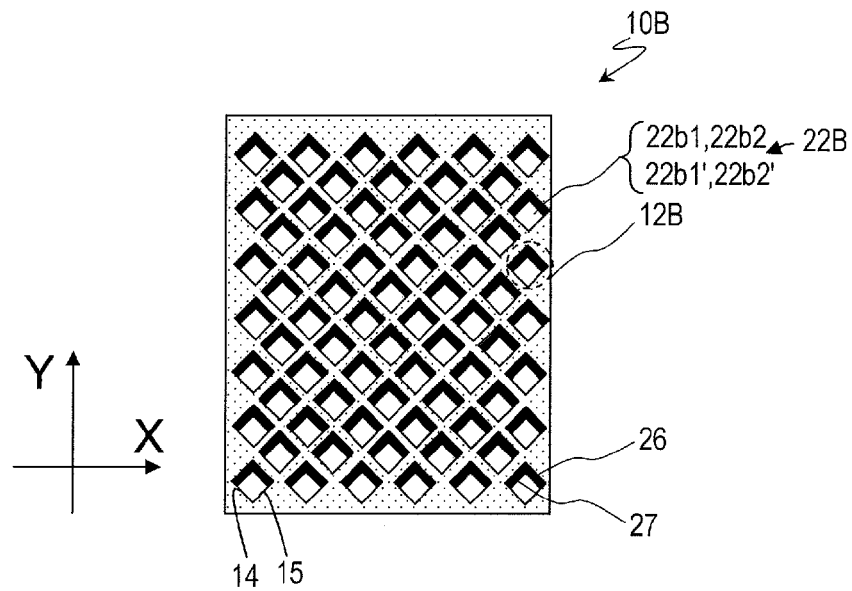
FIG. 4 (a) is a schematic plan view of a reflective imaging element 10B according to another embodiment of the present invention; and (b) is a diagram showing a schematic perspective view of a unit imaging element 12B and a light path (arrow 60).
Figure 4:
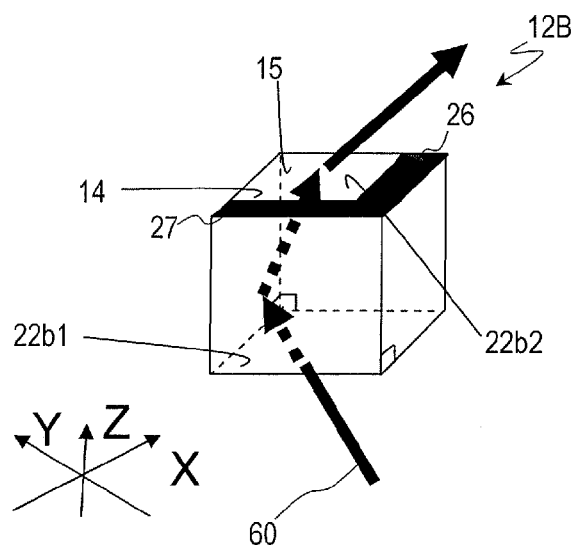
Figure 5:
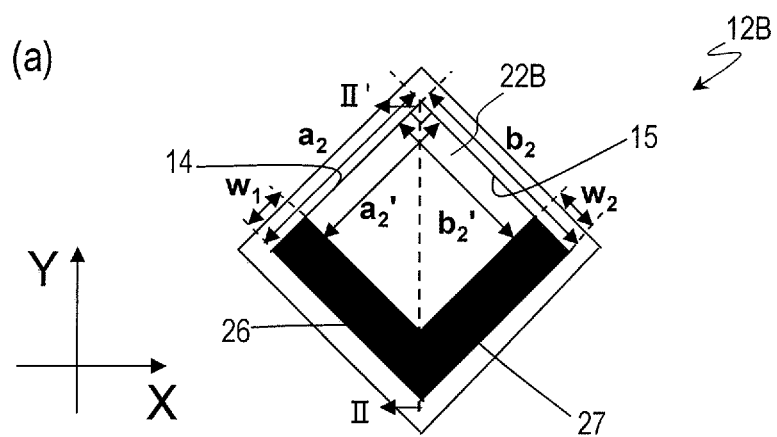
FIG. 5 (a) is a schematic upper plan view of the unit imaging element 12B; and (b) is a schematic cross-sectional view of the unit imaging element 12B corresponding to II-II' in (a).
Figure 5:
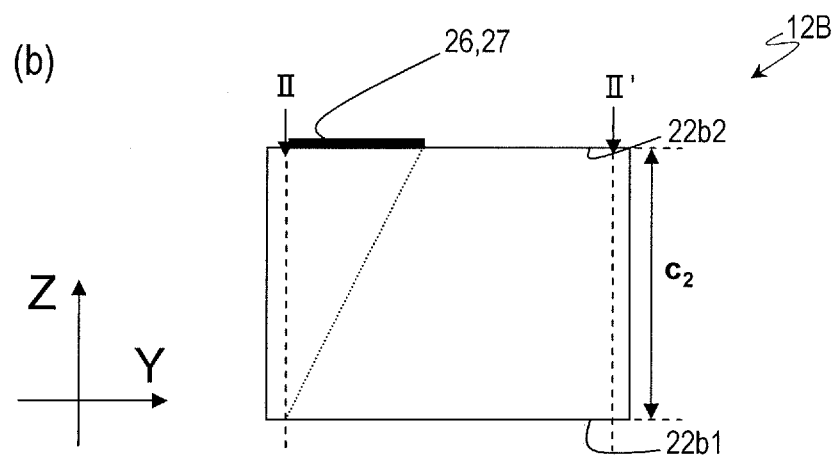

Next, with reference to FIG. 4 and FIG. 5, another reflective imaging element 10B will be described.

FIG. 4(a) is a schematic plan view showing the construction of the reflective imaging element 10B. FIG. 4(b) is a diagram showing a schematic perspective view of the unit imaging element 12B and a light path 60. Each unit element composing the reflective imaging element 10B is referred to as a unit imaging element 12B.

The reflective imaging element 10B shown in FIG. 4(a) has a plate-like substrate and a plurality of holes 22B penetrating through the plate-like substrate along the thickness direction thereof. The plurality of holes 22B are hollow. On the inner walls of the plurality of holes 22B, two orthogonally-disposed specular elements 14 and 15 and a first principal face on which to receive light from an object (e.g., the display panel 30), and a second principal face parallel to the first principal face are present. The plurality of holes 22B have a plurality of first openings 22b1' on the first principal face side, and a plurality of second openings 22b2' on the second principal face side, such that the area of each of the plurality of first openings 22b1' is equal to the area of each of plurality of second openings 22b2'. The first principal face has a plurality of first light-transmitting portions 22b1, whereas the second principal face has a plurality of second light-transmitting portions 22b2. Moreover, the second principal face has a plurality of light shielding layers 26 and 27, which are disposed on the second principal face side so as to partially shade each of the second openings 22b2' of the plurality of holes 22B, such that the plurality of second openings 22b2', which are only partially shaded by the plurality of light shielding layers 26 and 27, respectively define the plurality of second light-transmitting portions 22b2. As a result, the area of each of the plurality of first light-transmitting portions 22b1 is larger than the area of each of the plurality of second light-transmitting portions 22b2. Furthermore, the plurality of holes 22B may be filled with transparent resin or the like. The reflective imaging element 10B is structured so that a transparent substrate such as a glass substrate or an acrylic substrate, having the light shielding layers 26 and 27 formed by a photolithography technique or the like, is disposed on the second principal face. Alternatively, it may be structured so that the light shielding layers 26 and 27 are formed directly on the second principal face. In other words, the reflective imaging element 10B has a structure such that the light shielding layers 26 and 27 are provided instead of the taper elements 24 and 25 of the reflective imaging element 10A.

As shown in FIG. 4(b), the unit imaging element 12B has a throughhole along its thickness direction (z direction). The shape of the throughhole 22B is a rectangular solid. Moreover, the shape of the throughhole 22B as viewed from the normal direction of the reflective imaging element 10B is essentially rectangular. Furthermore, on the inner walls of the throughhole 22B, the unit imaging element 12B has two orthogonally-disposed specular elements 14 and 15, the first light-transmitting portion 22b1, and the second light-transmitting portion 22b2. The two specular elements 14 and 15 are disposed perpendicular to the first principal face. Furthermore, on the second principal face, the plurality of light shielding layers 26 and 27 are provided, such that the second opening 22b2' only partially shaded by the light shielding layers 26 and 27 defines the second light-transmitting portion 22b2. The light shielding layers 26 and 27 are formed on the faces not having the two specular elements 14 and 15 formed thereon. As indicated by arrow 60, the light entering the unit imaging element 12B forms an image in the air by undergoing two reflections (metallic reflection or total reflection) at the two specular elements 14 and 15.

Next, the light shielding layers 26 and 27 will be described with reference to FIG. 5.

FIG. 5(a) is a schematic perspective view of the unit imaging element 12B. FIG. 5(b) is a schematic cross-sectional view of the unit imaging element 12B corresponding to II-II' in FIG. 5(a).

As shown in FIG. 5(a), at the faces having the two specular elements 14 and 15 formed thereon, the first light-transmitting portion 22b1 and the second light-transmitting portion 22b2 of the unit imaging element 12B each have a first side and a second side which are orthogonal to each other. The first side of the first light-transmitting portion 22b1 has a length $a_2$, and the second side a length $b_2$. The first side of the second light-transmitting portion 22b2 has a length $a_2'$, and the second side a length $b_2'$. Moreover, the throughhole 22B has a height $c_2$, and the area $a_2 b_2$ ($a_2 \times b_2$) of the first light-transmitting portion 22b1 and the area $a_2' b_2'$ ($a_2' \times b_2'$) of the second light-transmitting portion 22b2 are of the relationship: area $a_2 b_2 >$ area $a_2' b_2'$. Furthermore, the unit imaging element 12B has the light shielding layers 26 and 27 on the second principal face, at the faces opposing the specular elements 14 and 15. The light shielding layer 26 has a width $w_1$, and the light shielding layer 27 has a width $w_2$. The width $w_1$ satisfies $0 < w_1 < a_2$, and the width $w_2$ satisfies $0 < w_2 < b_2$.

By providing such light shielding layers 26 and 27, similar effects to those of the taper elements 24 and 25 described above can be obtained. Although an example is illustrated herein where the two light shielding layers 26 and 27 have the same width w, they may have different widths from each other. There is no limitation as to the upper limit value of the width w of the light shielding layers 26 and 27, which may be determined as appropriate by taking luminance of the formed image, etc., into consideration. Moreover, the width w of the light shielding layers 26 and 27 is to be determined so that the aforementioned second light-transmitting portion 22b2 is not closed.

Thus, by forming the taper elements 24 and 25, or the light shielding layers 26 and 27, each first light-transmitting portion 22a1 or 22b1 of the reflective imaging element and each second light-transmitting portion 22a2 or 22b2 can be made to differ in area (aperture ratio), thus resulting in a range of light incident angles such that the aerial image has a constant luminance. Moreover, stray light not contributing to image formation can be restrained from exiting from the light-outgoing side of the reflective imaging element. Therefore, an optical system whose aerial image luminance is not easily affected by the incident angle of light from an object can be constructed, whereby an aerial image which undergoes little change in luminance and allows for high visual recognition.

Figure 6:
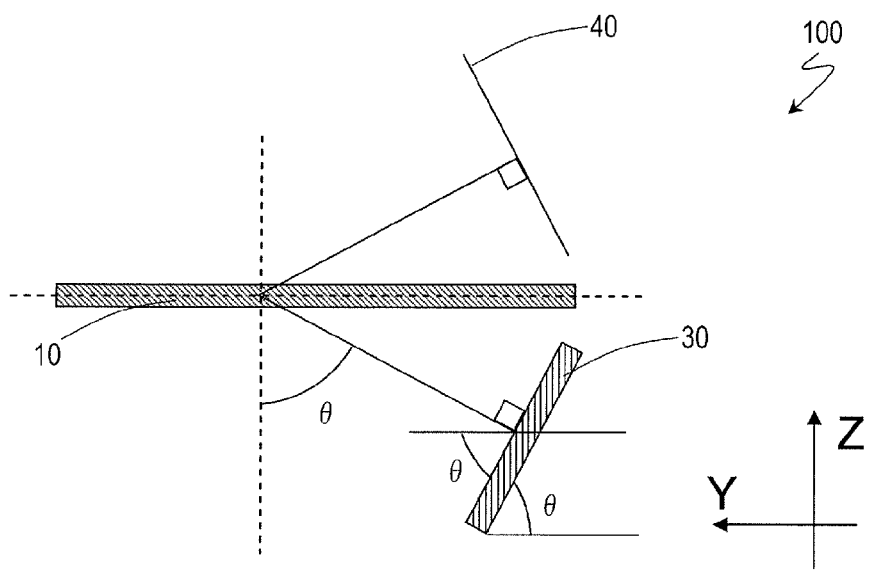
FIG. 6 (a) is a schematic cross-sectional view showing the construction of an optical system 100 according to an embodiment of the present invention; (b) is a schematic upper plan view of a unit imaging element 12; and (c) is a schematic cross-sectional view of the unit imaging element 12A corresponding to III-III' in (b).
Figure 6:
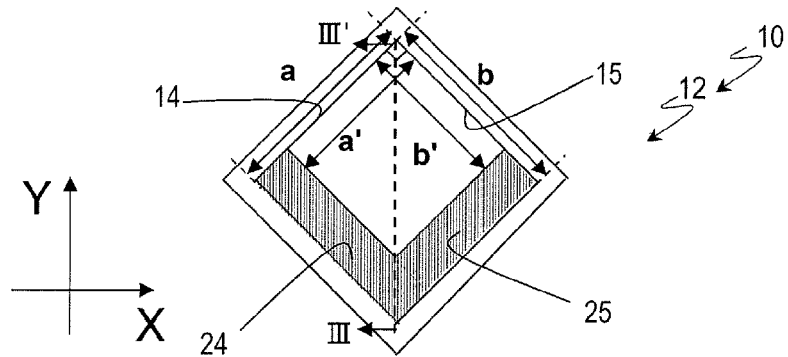
Figure 6:
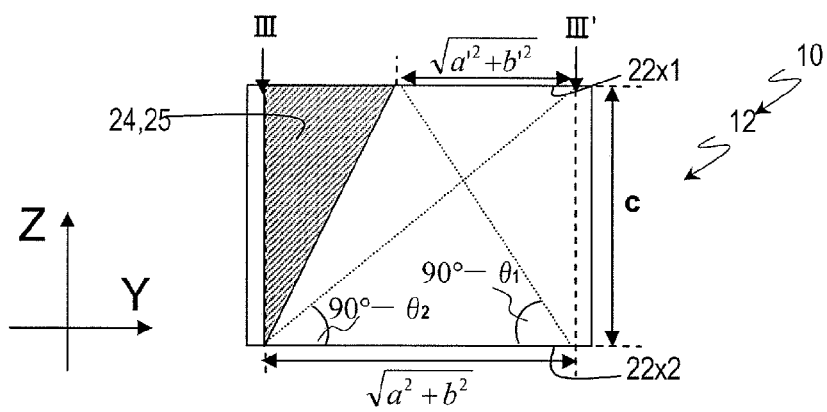

Next, with reference to FIG. 6(a), the construction of an optical system 100 according to an embodiment of the present invention will be described. FIG. 6(a) is a schematic cross-sectional view showing the construction of the optical system 100.

The optical system 100 shown in FIG. 6(a) includes the aforementioned reflective imaging element 10A (hereinafter referred to as the reflective imaging element 10) and a display panel 30 (e.g., a liquid crystal display panel) disposed on the first principal face side. A principal ray of light which goes out from the display surface of the display panel 30 in the normal direction strikes the reflective imaging element 10 with an incident angle θ such that 0°<θ<90°, where the incident angle θ is defined as the angle between the normal direction of the first principal face and the incident direction of light striking the first principal face. As light enters the two respective specular elements 14 and 15 which the reflective imaging element 10 has, and is reflected therefrom (metallic reflection or total reflection), an image is formed at a respective position of planar symmetry 40, the reflective imaging element 10 being the plane of symmetry, whereby an image which is displayed on the display surface of the display panel 30 is displayed in the air.

As the display panel 30, it is preferable to use a liquid crystal display panel whose viewing angle is easy to control, for example. Otherwise, an organic EL display, a plasma display, a projector, or an LED display may be used as the display panel. In the case of using a display panel whose viewing angle is difficult to control, e.g., an organic EL display or a plasma display, it is necessary to use a viewing angle controlling film to obtain a display panel 30 which is adapted to the desired viewing angle. Furthermore, in the case where a projector or an LED display is used as the display panel, there is strong light directivity and a narrow viewing angle, so that it is preferable to use a lens for refracting rays between the display panel 30 and the reflective imaging element 10.

Next, with reference to FIG. 6(b) and FIG. 6(c), the light incident angle θ of the optical system 100 will be described. FIG. 6(b) is a schematic upper plan view of a unit imaging element 12 which the reflective imaging element 10 has. FIG. 6(c) is a schematic cross-sectional view of the unit imaging element 12 corresponding to III-III' in FIG. 6(b).

At the faces having the two specular elements 14 and 15, a first light-transmitting portion 22x1 and a second light-transmitting portion 22x2 of the unit imaging element each have a first side and a second side which are orthogonal to each other. The first side of the first light-transmitting portion 22x1 has a length a, and the second side a length b. The first side of the second light-transmitting portion 22x2 has a length a', and the second side a length b'. Moreover, the throughhole has a height c, and the area ab(a×b) of the first light-transmitting portion 22b1 and the area a'b'(a'×b') of the second light-transmitting portion 22b2 are of the relationship area: ab>area a'b'. The area of the second light-transmitting portion 22x2 of the unit imaging element 12 is smaller than the area of the first light-transmitting portion 22x1, due to the aforementioned taper elements 24 and 25 or the like (hereinafter referred to as the light shielding elements). Therefore, when the incident angle θ becomes equal to or greater than an incident angle $\theta_1$ expressed by eq. (3),

[math. 3]

$$\theta_1 = 90° - \tan^{-1}\left(\frac{c}{\sqrt{a'^2 + b'^2}}\right) \quad 0° < \theta_1 < 90° \quad (3)$$

the component of light contributing to image formation also begins to be cut, unlike in the case where the area of the first light-transmitting portion 22x1 and the area of the second light-transmitting portion are equal (ab=a'b') (i.e., where the light shielding elements are not provided). When the light emitted from the display panel 30 is parallel light, since components of light are cut off by the light shielding elements, the imaging efficiency is constant while the incident angle θ is between the incident angle $\theta_1$ and the incident angle $\theta_2$ expressed by eq. (4) below (eq. (5) below).

[math. 4]

$$\theta_2 = 90° - \tan^{-1}\left(\frac{c}{\sqrt{a^2 + b^2}}\right) \quad 0° < \theta_2 < 90° \quad (4)$$

[math. 5]

$$90° - \tan^{-1}\left(\frac{c}{\sqrt{a'^2 + b'^2}}\right) \leq \theta \leq 90° - \tan^{-1}\left(\frac{c}{\sqrt{a^2 + b^2}}\right) \quad 0° < \theta < 90° \quad (5)$$

The incident angle $\theta_2$ is an optimum incident angle that would provide the highest imaging efficiency when no light shielding elements are provided. In the optical system 100, the optimum incident angle θ is an intermediate value $\theta_3$ (eq. (6) below) between the incident angle $\theta_1$ and the incident angle $\theta_2$.

[math. 6]

$$\theta_3 = \frac{\left(90° - \tan^{-1}\left(\frac{c}{\sqrt{a'^2 + b'^2}}\right)\right) + \left(90° - \tan^{-1}\left(\frac{c}{\sqrt{a^2 + b^2}}\right)\right)}{2} \quad (6)$$

$$0° < \theta_3 < 90°$$

Therefore, the tilting angle of the display panel 30 is adjusted so that the incident angle of each principal ray of light which is emitted from the display panel 30 and strikes reflective imaging element 10 equals the incident angle $\theta_3$. By thus adjusting the tilting angle of the display panel 30, a high imaging efficiency is obtained.

Figure 7:
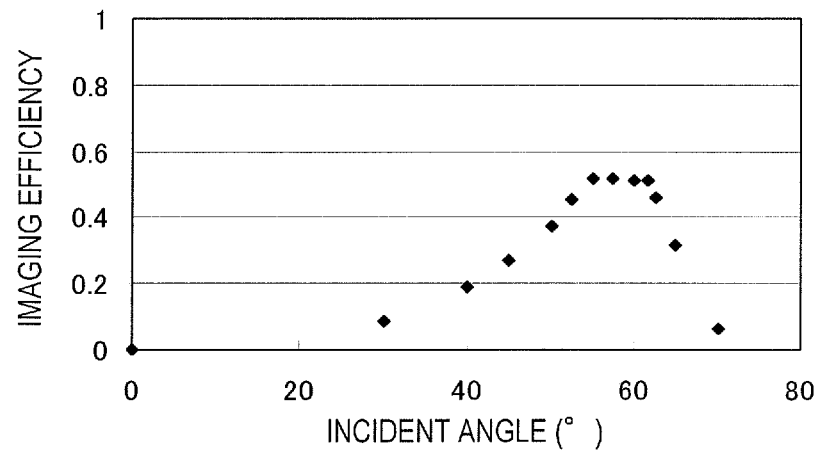
FIG. 7 A graph showing a relationship between the light incident angle and imaging efficiency in the optical system 100.

For example, the first side and second side of the first light-transmitting portion 22x1 of the unit imaging element 12 had lengths a and b of 209 μm; the first side and second side of the second light-transmitting portion 22x2 had lengths a' and b' of 156 μm; and the throughhole 22 had a height c of 160 μm. FIG. 7 indicates a graph showing the relationship between the light incident angle and imaging efficiency in this case.

As is seen from FIG. 7, the imaging efficiency is constant at incident angles from 54° to 61.6°. These values are derived from eqs. (5) and (6) above. Therefore, the display panel 30 was disposed so that the incident angle θ was 57.8°, which is an intermediate value between 54° and 61.6°. As is seen from FIG. 7, the imaging efficiency is highest when the incident angle θ is in the range of no less than 54° and no more than 61.6°; therefore, the display panel 30 may be disposed so that the incident angle θ of a principal ray of light which is emitted from the display panel 30 and strikes the reflective imaging element 10 is in the aforementioned incident angle range.

With the optical system 100 having the reflective imaging element 10, an aerial image which undergoes little change in luminance and allows for high visual recognition is obtained.

INDUSTRIAL APPLICABILITY

The present invention is broadly applicable to any optical system having a reflective imaging element capable of forming an image of an object in a space and a liquid crystal display panel or the like.

REFERENCE SIGNS LIST 10, 10A, 10B, 80 reflective imaging element
12, 12A, 12B unit imaging element
14, 15 specular element
22A, 22B hole
24, 25 taper element
26, 27 light shielding layer
30 display panel
40 position
90, 100 optical system

The invention claimed is:

1. An optical system, comprising:
a reflective imaging element; and
a display panel, wherein
the reflective imaging element, comprises:
a plate-like substrate; a plurality of holes penetrating through the plate-like substrate along a thickness direction thereof; two orthogonally-disposed specular elements on inner walls of the plurality of holes; a first principal face on which light from the display panel is received; and a second principal face parallel to the first principal face, wherein,
the first principal face has a plurality of first light-transmitting portions, and the second principal face has a plurality of second light-transmitting portions, an area of each of the plurality of first light-transmitting portions being larger than an area of each of the plurality of second light-transmitting portions;
each of the plurality of first light-transmitting portions is connected to a respective one of the plurality of second light-transmitting portions via a corresponding hole among the plurality of holes;
two taper elements opposing the two specular elements are comprised;
the two taper elements each have a first side which is parallel to the first principal face, a second side which is orthogonal to the first principal face and to the first side, and a hypotenuse which meets the first and second sides and constitutes an angle $\beta$ with the second side; and
an angle constituted by a normal direction of the first principal face and an incident direction of light striking the first principal face defines an incident angle $\theta$, such that, in a range of $0°<\theta<90°$,
the angle $\beta$ satisfies $(90°-\theta)/4 \leq \beta$, and the light is reflected at least two times at the two taper elements.

2. The optical system of claim 1, wherein the angle $\beta$ satisfies $(90°-\theta)/2 \leq \beta$.

3. An optical system, comprising:
a reflective imaging element; and
a display panel, wherein
the reflective imaging element, comprises:
a plate-like substrate; a plurality of holes penetrating through the plate-like substrate along a thickness direction thereof; two orthogonally-disposed specular elements on inner walls of the plurality of holes; a first principal face on which light from the display panel is received; and a second principal face parallel to the first principal face, wherein,
the first principal face has a plurality of first light-transmitting portions, and the second principal face has a plurality of second light-transmitting portions, an area of each of the plurality of first light-transmitting portions being larger than an area of each of the plurality of second light-transmitting portions;
each of the plurality of first light-transmitting portions is connected to a respective one of the plurality of second light-transmitting portions via a corresponding hole among the plurality of holes; and
a light shielding layer opposing the two specular elements is comprised on the second principal face.

4. The optical system of claim 1, the reflective imaging element further comprising:
a plurality of light shielding members disposed at the second principal face side of the substrate, each of the plurality of light shielding members being disposed so as to only partially shade a second opening each of the plurality of holes, wherein
the plurality of second openings only partially shaded by the plurality of light shielding members define the plurality of second light-transmitting portions.

5. An optical system comprising: a reflective imaging element; the reflective imaging element comprising:
a plate-like substrate; a plurality of holes penetrating through the plate-like substrate along a thickness direction thereof; two orthogonally-disposed specular elements on inner walls of the plurality of holes; a first principal face on which light from a display panel is received; and a second principal face parallel to the first principal face, wherein,
the first principal face has a plurality of first light-transmitting portions, and the second principal face has a plurality of second light-transmitting portions, an area of each of the plurality of first light-transmitting portions being larger than an area of each of the plurality of second light-transmitting portions;
each of the plurality of first light-transmitting portions is connected to a respective one of the plurality of second light-transmitting portions via a corresponding hole among the plurality of holes;
two taper elements opposing the two specular elements are comprised;
the two taper elements each have a first side which is parallel to the first principal face, a second side which is orthogonal to the first principal face and to the first side, and a hypotenuse which meets the first and second sides and constitutes an angle $\beta$ with the second side; and
an angle constituted by a normal direction of the first principal face and an incident direction of light striking the first principal face defines an incident angle $\theta$, such that, in a range of $0°<\theta<90°$,
the angle $\beta$ satisfies $(90°-\theta)/4 \leq \beta$;
and the display panel disposed at the first principal face side,
the optical system causing an image displayed on a display surface of the display panel to form an image at a position of planar symmetry with respect to the reflective imaging element as a plane of symmetry, wherein,
the first and second light-transmitting portions of the reflective imaging element each have first and second sides orthogonal to each other;
ab>a'b' holds, where a is a length of the first side and b is a length of the second side of the first light-transmitting portion, a' is a length of the first side and b' is a length of the second side of the second light-transmitting portion, and c is a height of the hole; and an incident angle θ constituted by a normal direction of the first principal face and an incident direction of light on the first principal face satisfies the following eq. (1) in a range of 0°<θ<90°

$$90° - \tan^{-1}\left(\frac{c}{\sqrt{a'^2 + b'^2}}\right) \leq \theta \leq 90° - \tan^{-1}\left(\frac{c}{\sqrt{a^2 + b^2}}\right) \quad (1)$$

6. The optical system of claim 5, wherein the incident angle θ satisfies the following eq. (2), $$\theta = \frac{\left(90° - \tan^{-1}\left(\frac{c}{\sqrt{a'^2 + b'^2}}\right)\right) + \left(90° - \tan^{-1}\left(\frac{c}{\sqrt{a^2 + b^2}}\right)\right)}{2} \quad (2)$$

7. The optical system of claim 5, wherein the display panel is a liquid crystal display panel.

* * * * *